United States Patent
Yuuki (10) Patent No.: US 8,423,729 B2
(45) Date of Patent: Apr. 16, 2013

(54) PART INFORMATION RESTORATION METHOD, PART INFORMATION MANAGEMENT METHOD AND ELECTRONIC APPARATUS

(75) Inventor: Kazuhiro Yuuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 606 days.

(21) Appl. No.: 12/219,233

(22) Filed: Jul. 17, 2008

(65) Prior Publication Data

US 2008/0282046 A1  Nov. 13, 2008

Related U.S. Application Data

(63) Continuation of application No. PCT/JP2006/301675, filed on Feb. 1, 2006.

(51) Int. Cl.
*G06F 12/00* (2006.01)

(52) U.S. Cl.
USPC .................................. 711/159; 711/E12.093

(58) Field of Classification Search .................. None
See application file for complete search history.

(56) References Cited

U.S. PATENT DOCUMENTS

| 5,864,664 A | 1/1999 | Capps, Jr. et al. |
| 6,694,450 B1 | 2/2004 | Kidder et al. |
| 2004/0005052 A1 | 1/2004 | Maeda |
| 2005/0240830 A1 * | 10/2005 | Kubo et al. ..................... 714/45 |

FOREIGN PATENT DOCUMENTS

| EP | 1 341 085 A2 | 9/2003 |
| JP | 1-296356 | 11/1989 |
| JP | 3-196227 | 8/1991 |
| JP | 2000-322333 | 11/2000 |
| JP | 2003-186705 | 7/2003 |
| JP | 2003-256290 | 9/2003 |

OTHER PUBLICATIONS

International Search Report mailed Mar. 20, 2006 in connection with the International application No. PCT/JP2006/301675.
European Search Report dated Jul. 8, 2010 and issued in corresponding European Patent Application 06712818.1.

* cited by examiner

*Primary Examiner* — Charles Rones
*Assistant Examiner* — Eric Loonan
(74) *Attorney, Agent, or Firm* — Staas & Halsey LLP (57) ABSTRACT

A part information restoration method is adapted to an electronic apparatus having first and second parts which are replaceable and are provided with a nonvolatile memory for storing part information unique to the part. The method includes storing, in a first nonvolatile memory of the first part, part information of the first part, and saving part information of the second part as a first reference information at least when replacing the second part, storing, in a second nonvolatile memory of the second part, the part information of the second part, and saving the part information of the first part as second reference information at least when replacing the first part. The method restores the first reference information in the second nonvolatile memory or restores the second reference information in the first nonvolatile memory, after replacing the first or second part.

12 Claims, 4 Drawing Sheets

FIG.2

| CASE | N1 | N2 | RESTORATION STATE |
|---|---|---|---|
| C1 | = | = | OK (NORMAL) |
| C2 | = | ≠ | N/A |
| C3 | = | null | N/A |
| C4 | ≠ | = | N/A |
| C5 | ≠ | ≠ | N/A (RETURN SCFU OR PANEL BOARD) |
| C6 | ≠ | null | AUTOMATICALLY RESTORE FROM SCFU → PANEL BOARD |
| C7 | null | = | N/A |
| C8 | null | ≠ | AUTOMATICALLY RESTORE FROM PANEL BOARD → SCFU |
| C9 | null | null | OK (INITIAL STATE OF MASS PRODUCTION) |

PART INFORMATION RESTORATION METHOD, PART INFORMATION MANAGEMENT METHOD AND ELECTRONIC APPARATUS

CROSS REFERENCE TO RELATED APPLICATIONS

This is a continuing application, filed under 35 U.S.C. §111(a), of International Application PCT/JP2006/301675, filed Feb. 1, 2006, the contents of which are incorporated herein by reference.

BACKGROUND OF THE INVENTION

1. Field of the Invention

The present invention generally relates to part information restoration methods, part information management methods and electronic apparatuses, and more particularly to a part information restoration method for automatically restoring information, such as information unique to a part, which is stored in a storage part of the part when replacing the part, a part information management method, and an electronic apparatus which employs such a part information restoration method or part information management method.

2. Description of the Related Art

Electronic apparatuses, such as computer systems, telephone sets, facsimile apparatuses and copying apparatuses, have replaceable parts that are provided with a nonvolatile memory. The nonvolatile memory of such a part stores information unique to the part, such as a serial number, and in some cases, stores information customized according to a user or a setup environment of the electronic apparatus, log information and the like.

For example, in the case of a computer system provided with a plurality of boards, when replacing one board for maintenance purposes or the like, the device number unique to the device, such as the serial number, which is stored in the nonvolatile memory of this one board is saved in a storage part of the computer system. After a new board is set in the computer system, the device number saved in the storage part is stored in the nonvolatile memory of this new board. Such a maintenance operation for restoring the information unique to the device is also carried out when a board is removed from the computer system and repaired, and the repaired board is again set in the computer system.

In addition, in the case where the nonvolatile memory of the board stores the information customized according to the user or the setup environment of the electronic apparatus, the log information and the like, such information is similarly saved in the storage part of the computer system when the board is replaced. After the new board or the repaired board is set in the computer system, the saved information in the storage part of the computer system is stored in the nonvolatile memory of the new or repaired board which is set in the computer system. Such a maintenance operation is required to restore the information stored in the board that is replaced or repaired.

If the maintenance operation is not carried out correctly or, at least a portion of the maintenance operation is not carried out, the computer system cannot be restored back to its original state after the new or repaired board is set in the computer system. In order to restore the computer system back to its original state, it is necessary to manually input the information, such as the information unique to the new or repaired board, and store the information in the nonvolatile memory of the new or repaired board.

It is conceivable to remove a nonvolatile memory chip from the board that is replaced, and to mount the removed nonvolatile memory chip on the board that is set in the computer system. But this conceivable method is undesirable in that there is a high possibility of damaging pins of the nonvolatile memory chip and damaging the nonvolatile memory chip itself when removing the nonvolatile memory chip from and mounting the removed nonvolatile memory chip on the board. Moreover, it is undesirable to remove the nonvolatile memory chip from the board and to mount the removed nonvolatile memory chip on the board at the setup location of the computer system, because there is a possibility of damaging other parts of the board.

A Japanese Laid-Open Patent Application No. 3-196227 a proposes a method of detecting whether or not a board of an electronic equipment system is replaced, by detecting whether or not information within a storage element which is provided on the board is erased. A Japanese Laid-Open Patent Application No. 2000-322333 proposes a method of automatically restoring device information unique to the device, which is saved in a save area, into a memory provided on a board of a computer system, when an erasure of the device information within the memory is detected.

Conventionally, the maintenance operation for saving the information stored in the nonvolatile memory of the part, such as a board, when replacing the part, and for restoring the information within the nonvolatile memory after replacing the part by storing the saved information in the nonvolatile memory of the replaced part, is extremely troublesome to carry out. Hence, there was a problem in that the larger the amount of information to be stored in the nonvolatile memory, the longer it takes for the maintenance operation to be carried out.

On the other hand, when the nonvolatile memory of the part stores the information, the information may include specific information which should not leak to a third party. Conventionally, such specific information is also saved in the storage part of the computer system, and an unauthorized copy of such specific information may be made. Furthermore, because the nonvolatile memory of the part, such as the board, which is removed from the computer system for replacement, also stores such specific information, an unauthorized copy of such specific information may be made. In a case where the specific information is a license code which enables the user to use the part such as the board, for example, there was a problem in that unauthorized copies of the license code may be made to create so-called clone boards.

SUMMARY OF THE INVENTION

Accordingly, one object of the present invention to provide a part information restoration method, a part information management method and an electronic apparatus, which can automatically save and restore information stored in a nonvolatile memory of a part when replacing the part, and can prevent the information stored in the nonvolatile memory of the part from leaking to a third party.

According to one aspect of the present invention, a part information restoration method adapted to an electronic apparatus which comprises first and second parts which are replaceable and are provided with a nonvolatile memory configured to store part information unique to the part, comprises storing, in a first nonvolatile memory of the first part, part information unique to the first part, and saving part information unique to the second part as a first reference information at least when replacing the second part; storing, in a second nonvolatile memory of the second part, the part information unique to the second part, and saving the part information unique to the first part as second reference information at least when replacing the first part; and restoring the first reference information in the second nonvolatile memory or restoring the second reference information in the first nonvolatile memory, after replacing the first or second part, based on a comparison result of the first reference information stored in the first nonvolatile memory and the part information unique to the second part stored in the second nonvolatile memory and a comparison result of the second reference information stored in the second nonvolatile memory and the part information unique to the first part stored in the first nonvolatile memory.

According to another aspect of the present invention, an electronic apparatus having first and second parts which are replaceable and are provided with a nonvolatile memory configured to store part information unique to the part, comprises a first control part configured to store, in a first nonvolatile memory of the first part, part information unique to the first part, and save part information unique to the second part as a first reference information at least when replacing the second part, and to store, in a second nonvolatile memory of the second part, the part information unique to the second part, and save the part information unique to the first part as second reference information at least when replacing the first part; and a second control part configured to restore the first reference information in the second nonvolatile memory or to restore the second reference information in the first nonvolatile memory, after replacing the first or second part, based on a comparison result of the first reference information stored in the first nonvolatile memory and the part information unique to the second part stored in the second nonvolatile memory and a comparison result of the second reference information stored in the second nonvolatile memory and the part information unique to the first part stored in the first nonvolatile memory.

According to another aspect of the present invention, a part information management method adapted to an electronic apparatus having a plurality of removable parts, comprises a step reading part information which is related to a first part and is stored in the first part, prior to removing the first part from the electronic apparatus; and a step writing the part information read from the first part into a second part which is different from the first part.

According to another aspect of the present invention, a part information management method adapted to an electronic apparatus having a plurality of removable parts, comprises a step reading part information stored in a first part when mounting the first part on the electronic apparatus; a step reading part information of a second part which is different from the first part and is mounted on the electronic apparatus; and a step comparing the part information read from the first part and the part information read form the second part.

According to another aspect of the present invention, an electronic apparatus mounted with a plurality of removable parts, comprises a connecting part configured to electrically connect to the parts; and a control part configured to read part information which is related to a first part and is stored in the first part, and to write the part information related to the first part into a second part which is different from the first part, when removing the first part from the electronic apparatus.

According to another aspect of the present invention, an electronic apparatus mounted with a plurality of removable parts, comprises a connecting part configured to electrically connect to the parts; and a control part configured to compare part information stored in a first part and part information stored in a second part which is mounted on the electronic apparatus, when mounting the first part on the electronic apparatus.

According to one aspect of the present invention, it is possible to realize a part information restoration method, a part information management method and an electronic apparatus, which can automatically save and restore information stored in a nonvolatile memory of a part when replacing the part, and prevent the information stored in the nonvolatile memory of the part from leaking to a third party.

DESCRIPTION OF THE PREFERRED EMBODIMENTS

In accordance with one aspect of the present invention, among a plurality of parts having a nonvolatile memory and forming an electronic apparatus, a replaceable first part employs a structure which shares information to be stored in the nonvolatile memory with a second part which is other than the first part. In other words, the nonvolatile memory of the first part stores information related to the first part, and also saves information related to the second part as a backup (reference). On the other hand, the nonvolatile memory of the second part stores information related to the second part, and the information related to the first part as a backup (reference).

When the first part is replaced by a new part or a repaired part, for example, the information stored in the nonvolatile memory of the replaced part and the information stored in the nonvolatile memory of the second part are compared. Based on a result of the comparison, the information related to the first part and saved in the nonvolatile memory of the second part is stored in the nonvolatile memory of the replaced part, so as to restore the state of the electronic apparatus immediately before the first part was replaced.

The above comparison includes a comparison of the information related to the first part and a comparison of the information related to the second part. For this reason, the so-called clone part of the first part cannot be created by simply copying the information related to the first part. In addition, when replacing the first part, the backup (reference) information stored in the nonvolatile memory of the first part may be erased, so as to prevent the backup (reference) information stored in the nonvolatile memory of the first part from leaking to a third part. Of course, the second part does not need to be a replaceable part.

A description will now be given of each of embodiments of a part information restoration method, a part information management method and an electronic apparatus according to the present invention, by referring to the drawings.

Figure 1:
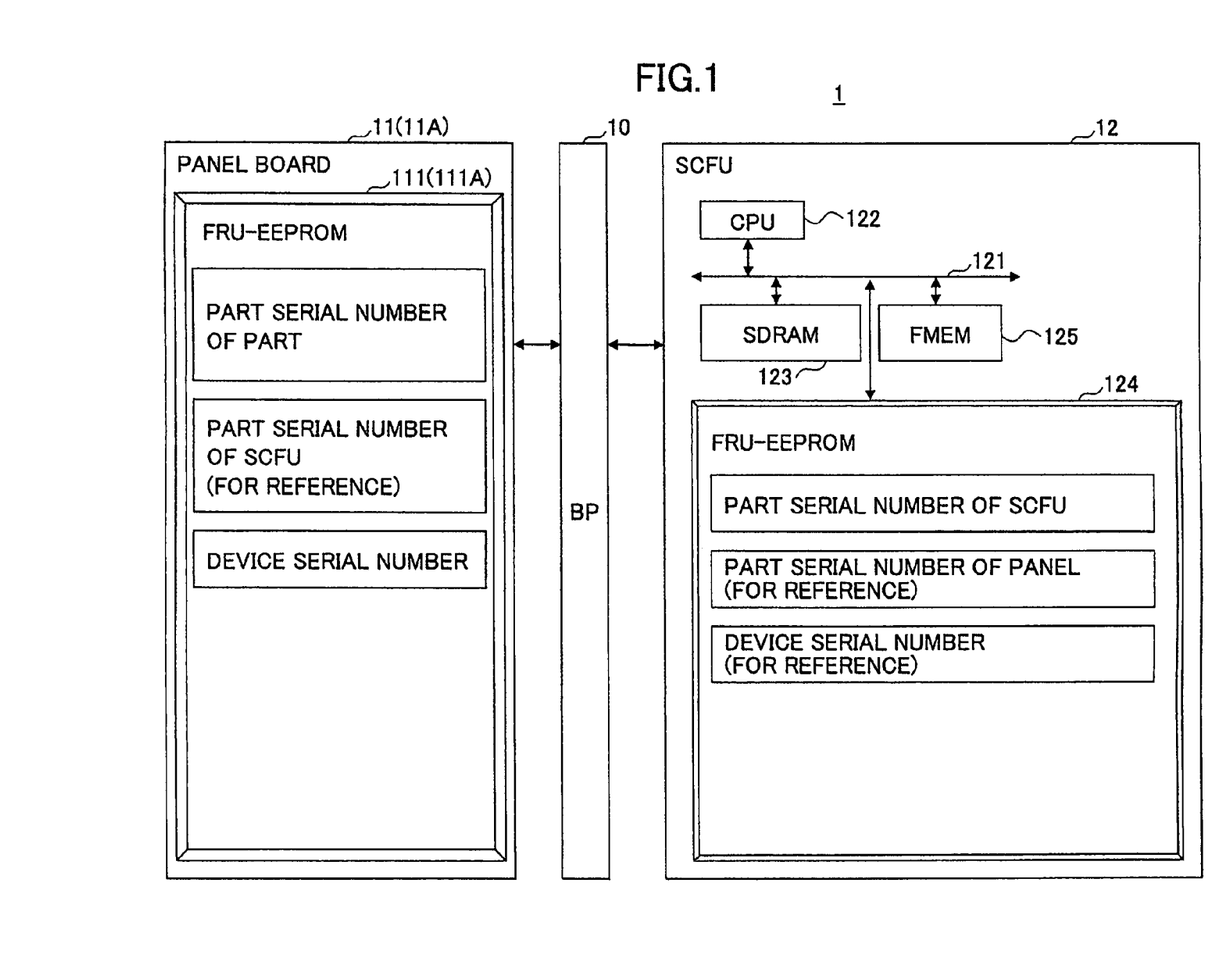
FIG. 1 is a block diagram showing an important part of an embodiment of an electronic apparatus according to the present invention.

FIG. 1 is a block diagram showing an important part of an embodiment of the electronic apparatus according to the present invention. This embodiment of the electronic apparatus employs an embodiment of the part information restoration method according to the present invention and an embodiment of the part information management method according to the present invention. In this embodiment, the present invention is applied to a computer system.

A computer system 1 shown in FIG. 1 includes a panel board 11 which is connected to a back panel (BP) 10, and a system control facility board (or SCFU: System Control Facility Unit) 12. The panel board 11 is used to store device setting information, and has a field replace unit (FRU) EEPROM (hereinafter FRU-EEPROM) 111. On the other and, the SCFU 12 is used to control the entire computer system 1, and includes a CPU 122, a SDRAM 123, a FRU-EEPROM 124 and a flash memory (FMEM) 125 which a reconnected via a bus 121. In this embodiment, the panel board 11 and the SCFU 12 are removable with respect to the back panel 10, but only the panel board 11 may be removable with respect to the back panel 10. In other words, among the two or more boards forming the computer system 1, it is sufficient for at least one board to be made replaceable. The replaceable board may have, in addition to a nonvolatile memory such as the FRU-EEPROM, a processor such as a CPU. The panel board 11 and SCFU 12 may be mounted on a plurality of back panels 10.

The FRU-EEPROM 111 of the panel board 11 stores information related to the panel board 11, such as a part serial number of the panel board 11, a part serial number of the SCFU 12 (reference part serial number indicating a serial number of another part which is a reference target), and a device serial number of the computer system 1. The part serial number is the serial number which is unique to the part and is managed in units of parts (in this case, in units of boards). The device serial number indicates the serial number which is unique to the device (computer system) and is managed in units of devices (in this case, in units of computer systems). These serial numbers are stored in the FRU-EEPROM 111 when setting up the computer system 1, for example. The FRU-EEPROM 111 may store other information, such as information unique to the computer system 1, which needs to be saved when replacing the panel board 11. For example, the information unique to the computer system 1 includes a host ID indicating an ID of a host unit, model information of the computer system 1, firmware operating environment variables of the computer system 1, and the like. In addition, the other information may include replacement log information, failure log information and the like of the panel board, for example. The backup target information related to the SCFU 12, such as the part serial number of the SCFU within the FRU-EEPROM 111, is saved every time the backup target information related to the SCFU 12, such as the part serial number of the SCFU within the FRU-EEPROM 124 of the SCFU 12, is updated, and is also saved immediately before the panel board 11 is replaced in response to a maintenance operation when replacing the panel board 11, for example.

The FRU-EEPROM 124 of the SCFU 12 stores information related to the SCFU 12, such as the part serial number of the SCFU 12, the part serial number of the panel board 11 (reference part serial number indicating the serial number of the other part which is the reference target, and the device serial number of the computer system 1. These serial numbers are stored in the FRU-EEPROM 124 when setting up the computer system 1, for example. The FRU-EEPROM 124 may store other information, such as firmware data which need to be saved when replacing the SCFU 12, and information customized according to the user or the setup environment of the computer system 1. For example, the customized information includes a power supply restoration mode or remote power supply control information, automatic power supply schedule information, air conditioning wait time, a power ON delay time, a fan stop extension time and the like. The other information may include replacement log information, failure log information and the like of the SCFU 12, for example. The backup target information related to the panel board 11, such as the part serial number of the panel board within the FRU-EEPROM 124, is saved every time the backup target information related to the panel board 11, such as the part serial number of the panel board within the FRU-EEPROM 111 of the panel board 11, is updated, and is also saved immediately before the panel board 11 is replaced in response to the maintenance operation when replacing the panel board 11, for example.

When replacing the board 11, for example, the information stored in the FRU-EEPROM 111 immediately before the replacement is saved in the FRU-EEPROM 124 of the SCFU 12, under the control of the CPU 122 of the SCFU 12 or, under the control of another processor (not shown) within the computer system 1. Similarly, the information stored in the FRU-EEPROM 124 immediately before the replacement of the panel board 11 is saved in the FRU-EEPROM 111 of the panel board 11, under the control of the CPU 122 of the SCFU 12 or, under the control of another processor (not shown) within the computer system 1.

In the description given hereinafter, it is assumed for the sake of convenience that the panel board 11 or the SCFU 12 is replaced, and that the panel board connected to the back panel 10 after the replacement of the panel board 11 has the same hardware structure as the panel board 11 or, the SCFU connected to the back panel 10 after the replacement of the SCFU 12 has the same hardware structure as the SCFU 12. In this case, the computer system 1 at least compares the part serial number (reference part serial number) of the SCFU within the FRU-EEPROM 111 and the part serial number of the SCFU within the FRU-EEPROM 124 of the SCFU 12, and compares the part serial number (reference part serial number of the panel board within the FRU-EEPROM 124 of the SCFU 12 and the part serial number of the panel board within the FRU-EEPROM 111, under the control of the CPU 122 of the SCFU 12 or, under the control of another processor (not shown) within the computer system 1. Based on results of the two comparisons, the computer system 1 carries out a restoration process, if necessary, to restore the information within the FRU-EEPROM 111 of the panel board 11 to the state immediately before the replacement of the panel board 11 or, restores the information within the FRU-EEPROM 124 of the SCFU 12 to the state immediately before the replacement of the SCFU 12.

In addition to the above two comparisons, it is desirable to compare the device serial number within the FRU-EEPROM 111 and the device serial number within the FRU-EEPROM 124, and carry out the restoration process only when the compared device serial numbers match. In this case, the above two comparisons may be made only when the compared device serial numbers match.

Figure 2:
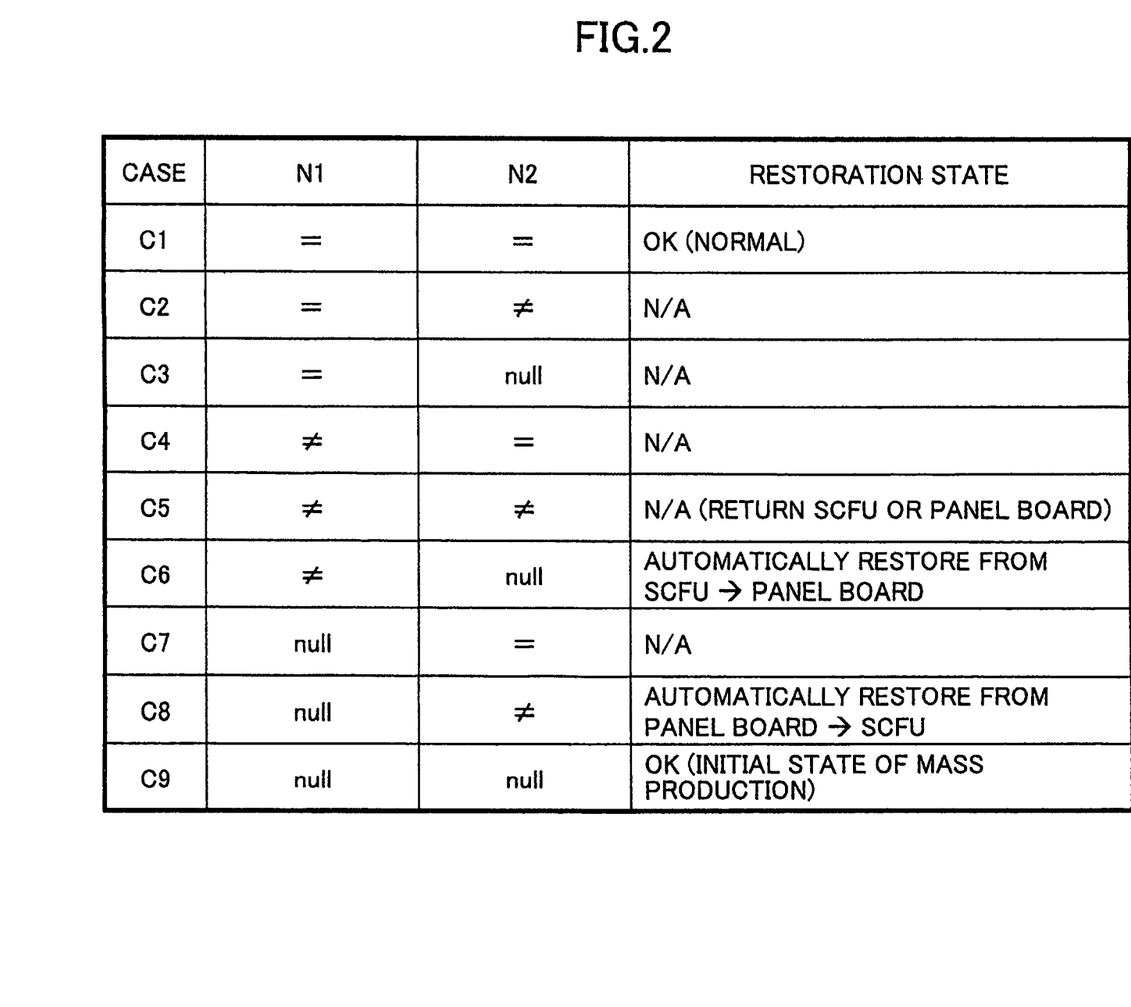
FIG. 2 is a diagram for explaining restoration states in accordance with two compared results.

FIG. 2 is a diagram for explaining restoration states in accordance with the two compared results described above. In FIG. 2, cases C1 through C9 show different restoration states that occur depending on a comparison result N1 between the part serial number (reference part serial number) of the panel board stored in the FRU-EEPROM 124 of the SCFU 12 and the part serial number of the panel board stored in the FRU-EEPROM 111 of the panel board 11, and a comparison result N2 between the part serial number (reference part serial number) of the SCFU stored in the FRU-EEPROM 111 of the panel board 11 and the part serial number of the SCFU stored in the FRU-EEPROM 124 of the SCFU 12. "="

indicates a case where the two compared values match, "≠" indicates a case where the two compared values do not match, "null" for the comparison result N1 indicates a case where no part serial number (reference part serial number) is stored within the FRU-EEPROM 124 of the SCFU 12, and "null" for the comparison result N2 indicates a case where no part serial number (reference part serial number) is stored within the FRU-EEPROM 111 of the panel board 11.

In the case C1, the FRU-EEPROM 124 of the SCFU 12 stores the part serial number (reference part serial number) of the panel board 11, and the FRU-EEPROM 111 of the panel board 11 stores the part serial number (reference part serial number) of the SCFU 12. Because the restoration state is normal as indicated by "OK", the use of the replaced panel board 11 or SCFU 12 is permitted, and it is regarded that the information other than the serial number is restored in the FRU-EEPROM 111.

In the case C2, the FRU-EEPROM 124 of the SCFU 12 stores the part serial number (reference part serial number) of the panel board 11, but the FRU-EEPROM 111 of the panel board 11 stores a reference part serial number different from the part serial number (reference part serial number) of the SCFU 12. Hence, from the comparison results N1 and N2, it is impossible to judge whether the panel board 11 has been replaced or the SCFU 12 has been replaced. Accordingly, as indicated by "N/A", the use of the panel board 11 and the SCFU 12 is prohibited.

In the case C3, the FRU-EEPROM 124 of the SCFU 12 stores the part serial number (reference part serial number) of the panel board 11, but the FRU-EEPROM 111 of the panel board 11 does not store a reference part serial number as indicated by "null". Hence, from the comparison results N1 and N2, it is impossible to judge whether the panel board 11 has been replaced or the SCFU 12 has been replaced. Accordingly, as indicated by "N/A", the use of the panel board 11 and the SCFU 12 is prohibited.

In the case C4, the FRU-EEPROM 124 of the SCFU 12 stores a reference part serial number different from the part serial number (reference part serial number) of the panel board 11. Hence, although the FRU-EEPROM 111 of the panel board 11 stores the part serial number (reference part serial number) of the SCFU 12, it is impossible to judge from the comparison results N1 and N2 whether the panel board 11 has been replaced or the SCFU 12 has been replaced. Accordingly, as indicated by "N/A", the use of the panel board 11 and the SCFU 12 is prohibited.

In the case C5, the FRU-EEPROM 124 of the SCFU 12 stores a reference part serial number different from the part serial number (reference part serial number) of the panel board 11, and the FRU-EEPROM 111 of the panel board 11 stores a reference part serial number different from the part serial number (reference part serial number) of the SCFU 12. Hence, a warning message is output, for example, and the use of the panel board 11 and the SCFU 12 is prohibited. Measures, such as returning the panel board 11 and the SCFU 12 to a factory as defective parts, are taken.

In the case C6, the FRU-EEPROM 124 of the SCFU 12 stores a reference part serial number different from the part serial number (reference part serial number) of the panel board 11, and the FRU-EEPROM 111 of the panel board 11 does not store a reference part serial number as indicated by "null". Accordingly, it is judged that the panel board 11 has been replaced, and the part serial number of the panel board 11 and the part serial number of the SCFU 12 which are stored in the FRU-EEPROM 124 of the SCFU 12 are automatically restored in the FRU-EEPROM 111 of the panel board 11 as the part serial number of the panel board and the reference part serial number, respectively.

In the case C7, the FRU-EEPROM 124 of the SCFU 12 does not store a reference part serial number as indicated by "null". Hence, although the FRU-EEPROM 111 of the panel board 11 stores the part serial number (reference part serial number) of the SCFU 12, it is impossible to judge from the comparison results N1 and N2 whether the panel board 11 has been replaced or the SCFU 12 has been replaced. Accordingly, as indicated by "N/A", the use of the panel board 11 and the SCFU 12 is prohibited.

In the case C8, the FRU-EEPROM 124 of the SCFU 12 does not store a reference part serial number as indicated by "null", and the FRU-EEPROM 111 of the panel board 11 stores a reference part serial number different from the part serial number (reference part serial number) of the SCFU 12. Hence, it is judged that the SCFU 12 has been replaced, and the part serial number of the SCFU and the part serial number of the panel board 11 which are stored in the FRU-EEPROM 111 of the board 11 are automatically restored in the FRU-EEPROM 124 of the SCFU 12 as the part serial number of the SCFU and the reference part serial number, respectively.

In the case C9, the FRU-EEPROM 124 of the SCFU 12 does not stores a reference part serial number as indicated by "null", and the FRU-EEPROM 111 of the panel board 11 does not store a reference part serial number as indicated by "null". Hence, it is judged that the panel board 11 and the SCFU 12 are in initial states thereof. Because the restoration state is normal (initial state) as indicated by "OK", the use of the replaced panel board 11 is permitted, and an initial setting process can be carried out to store the information such as the serial number in the FRU-EEPROM 111 and the FRU-EEPROM 124.

Figure 3:
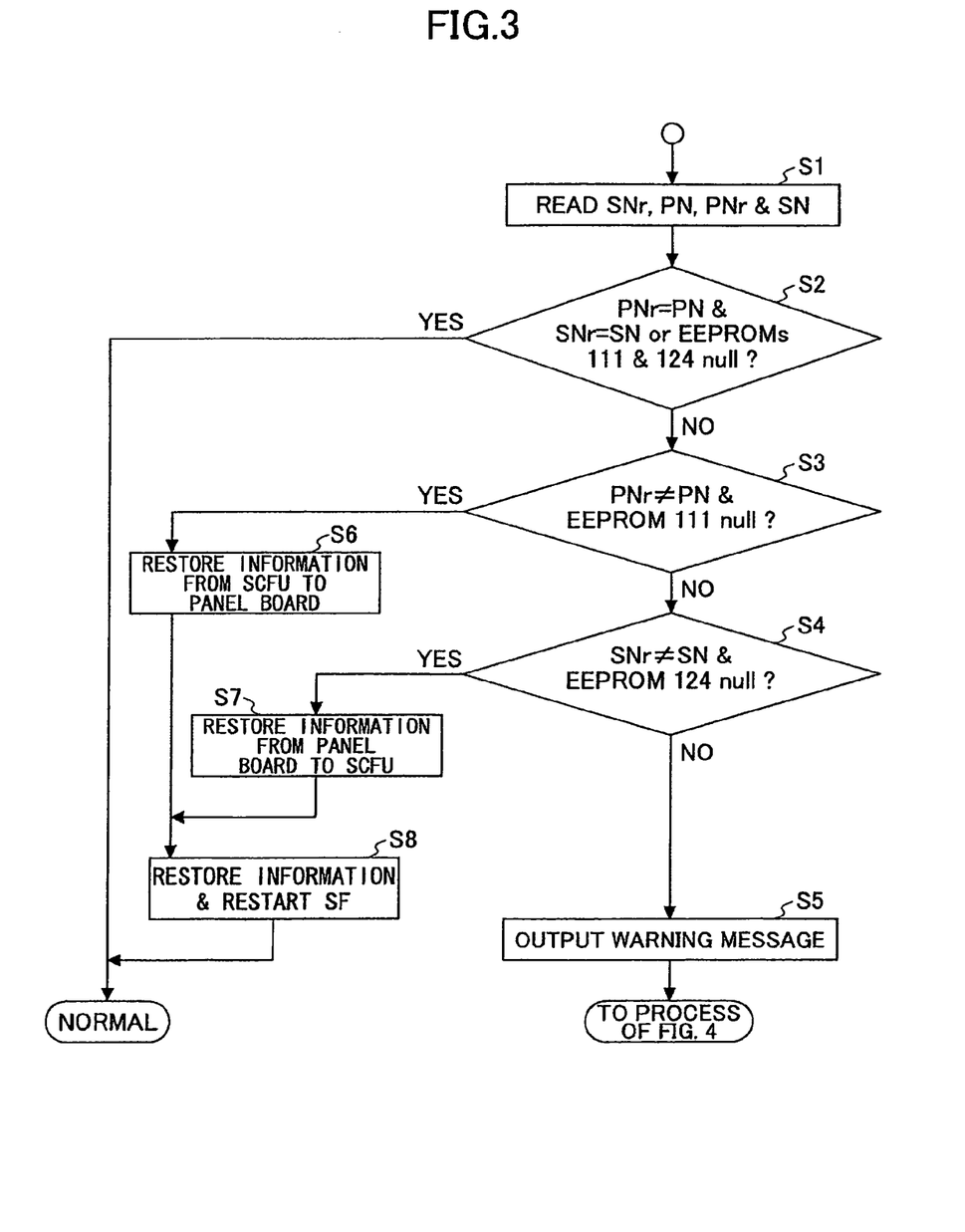
FIG. 3 is a flow chart for explaining an example of a process of the embodiment.

FIG. 3 is a flow chart for explaining an example of a process of the embodiment carried out under the control of the CPU 122 of the SCFU 12 or, under the control of another processor (not shown) within the computer system 1. The process shown in FIG. 3 is carried out by a first control means or first control part (CPU or processor) and a second control means or second control part (CPU or processor). The first control means saves the part serial number of the SCFU 12 within the FRU-EEPROM 124 into the FRU-EEPROM 111 when at least the SCFU 12 is replaced, and saves the part serial number of the panel board 11 within the FRU-EEPROM 111 into the FRU-EEPROM 124 when at least the panel board 11 is replaced. The second control means restores the reference information within the FRU-EEPROM 111 in the FRU-EEPROM 124 or, restores the reference information within the FRU-EEPROM 124 in the FRU-EEPROM 111, after replacing the SCFU 12.

In FIG. 3, when the power is input to the computer system 1 or, the power supply is turned ON, a step S1 reads a part serial number (reference part serial number) SNr of the SCFU and a part serial number PN of the panel board which are stored in the FRU-EEPROM 111 of the panel board 11, and a part serial number (reference part serial number) PNr of the panel board and a part serial number SN of the panel board which are stored in the FRU-EEPROM 124 of the SCFU 12.

A step S2 decides whether or not the part serial number (reference part number) PNr of the panel board stored in the FRU-EEPROM 124 of the SCFU 12 matches the part serial number PN of the panel board stored in the FRU-EEPROM 111 of the panel board 11 and the part serial number (reference part serial number) SNr of the SCFU stored in the FRU-EEPROM 111 of the panel board 11 matches the part serial number SN of the SCFU stored in the FRU-EEPROM 124 of the SCFU 12 or, a state where no part serial number (reference part serial number) is stored (null state) in the FRU-EEPROM 124 of the SCFU 12 and no part serial number (reference part serial number) is stored (null state) in the FRU-EEPROM 111 of the panel board 11 has occurred.

If the decision result in the step S2 is NO, a step S3 decides whether or not a state where the part serial number (reference part serial number) PNr of the panel board stored in the FRU-EEPROM 124 of the SCFU 12 does not match the part serial number PN of the panel board stored in the FRU-EEPROM 111 of the panel board 11 and no part serial number (reference part serial number) is stored (null state) in the FRU-EEPROM 111 of the panel board 11 has occurred.

If the decision result in the step S3 is NO, a step S4 decides whether or not a state where the part serial number (reference part serial number) SNr of the SCFU stored in the FRU-EEPROM 111 of the panel board 11 does not match the part serial number SN of the SCFU stored in the FRU-EEPROM 124 of the SCFU 12 and no part serial number (reference part serial number) is stored (null state) in the FRU-EEPROM 111 of the panel board 11 has occurred.

If the decision result in the step S4 is NO, the state corresponds to one of the cases C2, C3, C4, C5 and C7. Hence, a step S5 outputs a warning message indicating that the SCFU 12 and the panel board 11 do not match, for example, on a display part (not shown) of the computer system 1, and the power input is stopped, so that the process advances to a process shown in FIG. 4 which will be described later. By outputting such a warning message, it is possible to prevent unauthorized use of the so-called clone boards. In addition, it is possible to permit the use of the replaced panel board 11 or SCFU 12 after confirming the wishes of the user or a maintenance person based on an operation that is made by the user or maintenance person with respect to the warning message.

On the other hand, if the decision result in the step S2 is YES, the state corresponds to the case C1 or C9, that is, the normal state. In this case, the use of the panel board 11 and the SCFU 12 is permitted, regardless of whether the panel board 11 or the SCFU 12 has been replaced. In the case C1, if there is information other than the part serial number, it is assumed that such information is also restored in the FRU-EEPROM 111. In the case C9, it is assumed that the part serial number and information other than the part serial number are restorable in the FRU-EEPROM 111.

If the decision result in the step S3 is YES, the state corresponds to the case C6. Hence, a step S6 automatically restores the part serial number of the panel board 11 and the part serial number of the SCFU 12 which are stored in the FRU-EEPROM 124 of the SCFU 12, in the FRU-EEPROM 111 of the panel board 11, as the part serial number of the panel board and the reference part serial number, respectively, The process then advances to a step S8 which will be described later.

If the decision result in the step S4 is YES, the state corresponds to the case C8. Hence, a step S7 automatically restores the part serial number of the SCFU and the part serial number of the panel board 11 which are stored in the FRU-EEPROM 111 of the panel board 11, in the FRU-EEPROM 124 of the SCFU 12, as the part serial number of the SCFU and the reference serial number, respectively. The process then advances to the step S8.

The step S8 restores any information, other than the part serial number, which needs to be restored, and restarts the SCFU 12. Accordingly, in the case C6, the information related to the SCFU 12, other than the part serial number of the SCFU 12, is restored in the FRU-EEPROM 111 of the panel board 11 if necessary, and the SCFU 12 is restarted. In addition, in the case C8, the information related to the panel board 11, other than the part serial number of the panel board 11, is restored in the FRU-EEPROM 124 of the SCFU 12 if necessary, and the SCFU 12 is restarted.

In the case where the panel board 11 is a maintenance part which is to be replaced, the information related to the panel board 11 (and information of other backup targets if necessary), which is stored in the FRU-EEPROM 111 of the panel board 11, is saved in the FRU-EEPROM 124 of the SCFU 12 every time the information is updated, and is saved in the FRU-EEPROM 124 in response to a maintenance operation that is carried out when removing the panel board 11 from the computer system 1. In addition, the information related to the panel board 11, which is stored in the FRU-EEPROM 111 of the panel board 11, may be saved in the FRU-EEPROM 124 of the SCFU 12 in response to an update instruction which is received from the host unit or the like. When saving the information related to the panel board 11 stored in the FRU-EEPROM 111 into the FRU-EEPROM 124 of the SCFU 12, the information may be temporarily stored in the FMEM 125 or the like of the SCFU 12 before being saved in the FRU-EEPROM 124. It is desirable from the point of view of simplifying the control that the updating and the saving described above are carried out under the control of the CPU 122 of the SCFU 12 which is the saving destination of the information.

On the other hand, in the SCFU 12 is a maintenance part which is to be replaced, the information related to the SCFU 12 (and information of other backup targets if necessary), which is stored in the FRU-EEPROM 124 of the SCFU 12, is saved in the FRU-EEPROM 111 of the panel board 11 every time the information is updated, and is saved in the FRU-EEPROM 111 in response to a maintenance operation that is carried out when removing the SCFU 12 from the computer system 1. In addition, the information related to the SCFU 12, which is stored in the FRU-EEPROM 124 of the SCFU 12, may be saved in the FRU-EEPROM 111 of the panel board 11 in response to an update instruction which is received from the host unit or the like. In this embodiment, the panel board 11 which is the saving destination does not have a CPU, and thus, the updating and the saving described above are carried out under the control of a CPU within the computer system 1. However, if the panel board 11 has a CPU, it is desirable from the point of view of simplifying the control that the updating and the saving described above are controlled under this CPU of the panel board 11 which is the saving destination of the information.

Figure 4:
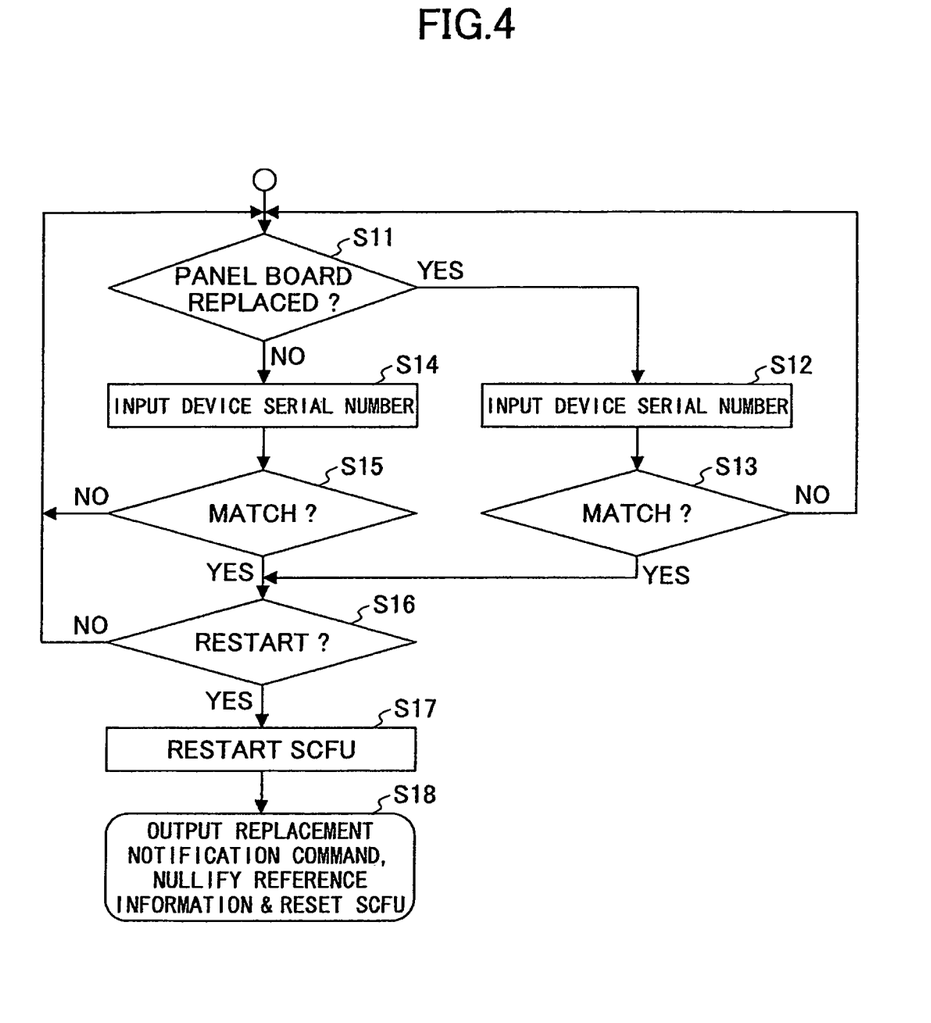
FIG. 4 is a flow chart for explaining an example of a process of the embodiment when a panel board and a SCFU do not match.

FIG. 4 is a flow chart for explaining an example of a process of this embodiment, which is, carried out under the control of the CPU 122 of the SCFU 12 or, under the control of another processor (not shown) within the computer system 1, when the panel board 11 and the SCFU 12 do not match. The process shown in FIG. 4 is carried out by a third control means or third control part (CPU or processor) for erasing the reference information stored in the FRU-EEPROM 124 when replacing the SCFU 12, and for erasing the reference information stored in the FRU-EEPROM 111 when replacing the panel board 11.

After the step S5 shown in FIG. 3, a step S11 shown in FIG. 4 is carried out. The step S11 decides, from the maintenance operation, whether or not the panel board 11 has been replaced. This maintenance operation includes input or the like made by the user or maintenance person from an input part (not shown) such as a keyboard of the computer system 1. If the panel board 11 is replaced and the decision result in the step S11 is YES, a step S12 urges input of the device serial number by the maintenance operation, and the device serial number is input from the input part by the user or maintenance person. A step S13 decides whether or not the input device serial number and the device serial number stored in the FRU-EEPROM 124 of the SCFU 12 match. The process returns to the step S11 if the decision result in the step S13 is NO. On the other hand, if the decision result in the step S13 is YES, the process advances to a step S16 which will be described later.

If the SCFU 12 is replaced and the decision result in the step S11 is NO, a step S14 urges input of the device serial number by the maintenance operation, and the device serial number is input from the input part by the user or maintenance person. A step S15 decides whether or not the input device serial number and the device serial number stored in the FRU-EEPROM 111 of the panel board 11 match. The process returns to the step S11 if the decision result in the step S15 is NO. On the other hand, if the decision result in the step S15 is YES, the process advances to the step S16.

The step S16 decides whether or not the SCFU 12 may be restarted, based on a reconfirmation input made by the user or maintenance person, and the process returns to the step S11 if the decision result is NO. If the decision result in the step S16 is YES, a step S17 restarts the SCFU 12. In addition, a step S18 outputs a replacement notification command of the panel board 11 or SCFU 12, and resets the SCFU 12 by erasing the reference part serial number stored in (putting into a null state) the FRU-EEPROM within the panel board 11 or SCFU 12 which is to be replaced. As a result, because the save information (reference part serial number) stored in the FRU-EEPROM within the panel board 11 or SCFU 12 which is to be replaced is erased (put into the null state), the panel board 11 or SCFU 12 which is to be replaced may be treated as a maintenance requiring maintenance after being removed from the computer system 1.

The reference information stored in the FRU-EEPROM within the panel board 11 or SCFU 12 which is to be replaced, is erased when the panel board 11 or SCFU 12 is removed from the computer system 1. For this reason, it is possible to prevent the reference information from leaking to a third party, and to prevent the so-called clone boards of the panel board 11 or SCFU 12 from being created.

In the embodiment described above, the present invention is applied to a computer system. However, the present invention is similarly applicable to various electronic apparatuses, such as telephone sets, facsimile apparatuses and copying apparatuses, having a plurality of replaceable parts provided with a nonvolatile memory for storing information unique to the part such as the serial number, and if necessary also storing information customized according to the user or the setup environment of the electronic apparatus, log information and the like. Moreover, the two parts which mutually save the information thereof, are desirably two parts which have a low possibility of being replaced simultaneously.

The present invention is applicable to electronic apparatuses, such as computer systems, telephone sets, facsimile apparatuses and copying apparatuses, having replaceable parts provided with a nonvolatile memory.

Further, the present invention is not limited to these embodiments, but various variations and modifications may be made without departing from the scope of the present invention.

What is claimed is:

1. A part information restoration method adapted to an electronic apparatus which comprises first and second parts which are replaceable and are provided with a nonvolatile memory configured to store part information unique to each respective part, comprising:
    storing part information unique to the first part in a first nonvolatile memory of the first part, and saving part information unique to the second part as first reference information in the first nonvolatile memory of the first part at least when replacing the second part;
    storing the part information unique to the second part in a second nonvolatile memory of the second part, and saving the part information unique to the first part as second reference information in the second nonvolatile memory of the second part at least when replacing the first part; and
    restoring the first reference information in the second nonvolatile memory or restoring the second reference information in the first nonvolatile memory, after replacing the first or second part, based on a comparison result of the first reference information stored in the first nonvolatile memory and the part information unique to the second part stored in the second nonvolatile memory and a comparison result of the second reference information stored in the second nonvolatile memory and the part information unique to the first part stored in the first nonvolatile memory.

2. The part information restoration method as claimed in claim 1, wherein at least one of the first and second parts includes a processor.

3. The part information restoration method as claimed in claim 1, wherein if the first part is a replacement target and the second part includes a processor, a process of saving the part information unique to the first part in the first nonvolatile memory as the second reference information when replacing the first part is carried out under a control of the processor.

4. The part information restoration method as claimed in claim 1, wherein the first nonvolatile memory stores a serial number of the electronic apparatus as the part information unique to the second part, and the second nonvolatile memory stores the serial number of the electronic apparatus as the part information unique to the first part.

5. The part information restoration method as claimed in claim 1, further comprising:
    judging that the first part has been replaced and restoring the part information unique to the second part and stored in the second nonvolatile memory into the first nonvolatile memory, if no reference information is stored in the first nonvolatile memory and the second reference information stored in the second nonvolatile memory does not match the part information unique to the first part and stored in the first nonvolatile memory.

6. The part information restoration method as claimed in claim 1, further comprising:
    erasing the first reference information stored in the first nonvolatile memory when replacing the first part, and erasing the second reference information stored in the second nonvolatile memory when replacing the second part.

7. An electronic apparatus having first and second parts which are replaceable and are provided with a nonvolatile memory configured to store part information unique to each respective part, comprising:
    a first control part configured to store part information unique to the first part in a first nonvolatile memory of the first part, and save part information unique to the second part as first reference information in the first nonvolatile memory of the first part at least when replacing the second part, and to store the part information unique to the second part in a second nonvolatile memory of the second part, and save the part information unique to the first part as second reference information in the second nonvolatile memory of the second part at least when replacing the first part; and a second control part configured to restore the first reference information in the second nonvolatile memory or to restore the second reference information in the first nonvolatile memory, after replacing the first or second part, based on a comparison result of the first reference information stored in the first nonvolatile memory and the part information unique to the second part stored in the second nonvolatile memory and a comparison result of the second reference information stored in the second nonvolatile memory and the part information unique to the first part stored in the first nonvolatile memory.

8. The electronic apparatus as claimed in claim 7, wherein at least one of the first control part and the second control part comprises a processor.

9. The electronic apparatus as claimed in claim 7, wherein if the first part is a replacement target and the second part includes a processor, a process of saving the part information unique to the first part in the first nonvolatile memory as the second reference information when replacing the first part is carried out under a control of the processor.

10. The electronic apparatus as claimed in claim 7, wherein the first nonvolatile memory stores a serial number of the electronic apparatus as the part information unique to the second part, and the second nonvolatile memory stores the serial number of the electronic apparatus as the part information unique to the first part.

11. The electronic apparatus as claimed in claim 7, wherein the second control part judges that the first part has been replaced and restores the part information unique to the second part and stored in the second nonvolatile memory into the first nonvolatile memory, if no reference information is stored in the first nonvolatile memory and the second reference information stored in the second nonvolatile memory does not match the part information unique to the first part and stored in the first nonvolatile memory.

12. The electronic apparatus as claimed in claim 7, further comprising:
a third control part configured to erase the first reference information stored in the first nonvolatile memory when replacing the first part, and to erase the second reference information stored in the second nonvolatile memory when replacing the second part.

* * * * *